(12) United States Patent
Norman et al.

(10) Patent No.: US 9,144,113 B2
(45) Date of Patent: Sep. 22, 2015

(54) METHOD AND APPARATUS TO MIGRATE TRANSPORT PROTOCOLS

(75) Inventors: Marten Norman, Spanga (SE); Tarmo Kuningas, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 906 days.

(21) Appl. No.: 13/142,501

(22) PCT Filed: Dec. 30, 2008

(86) PCT No.: PCT/SE2008/051575
§ 371 (c)(1),
(2), (4) Date: Jun. 28, 2011

(87) PCT Pub. No.: WO2010/077197
PCT Pub. Date: Jul. 8, 2010

(65) Prior Publication Data
US 2011/0270978 A1 Nov. 3, 2011

(51) Int. Cl.
*G06F 15/173* (2006.01)
*H04W 92/12* (2009.01)

(52) U.S. Cl.
CPC .................................... *H04W 92/12* (2013.01)

(58) Field of Classification Search
USPC ................. 709/201–235, 200; 455/450–467; 370/320–355, 401
See application file for complete search history.

(56) References Cited

U.S. PATENT DOCUMENTS

2001/0053145 A1* 12/2001 Willars et al. ................. 370/352
2006/0159121 A1* 7/2006 Sakata et al. .................. 370/466
2007/0058553 A1* 3/2007 Antal et al. .................... 370/248
2008/0311923 A1* 12/2008 Petrovic et al. ............... 455/450
2009/0239547 A1* 9/2009 Nitta et al. .................. 455/452.2

FOREIGN PATENT DOCUMENTS

WO 0191399 A 11/2001
WO 2005053333 A 6/2005

OTHER PUBLICATIONS

"3rd Generation Partnership Project; Technical Specification Group Radio Access Network; UTRAN Iub interface; signalling transport (Release 8)", 3GPP TS 25.432 V8.0.0, Dec. 1, 2008, 8 pages, XP002547337.

* cited by examiner

*Primary Examiner* — El Hadji Sall
(74) *Attorney, Agent, or Firm* — Rothwell, Figg, Ernst & Manbeck, P.C.

(57) ABSTRACT

The invention comprises a method for migrating control plane data transport between a control node (5) and a base station (5) controlled by the control node from an old and currently used transport technology, e.g. an ATM based transport option, to a new transport technology, e.g. an IP based transport option. A protocol stack for the new transport technology is created (31) in the control node (5). In a similar manner, a protocol stack for the new transport technology is created (31) in the base station (7). Thereafter, a connection based on the new transport technology is formed (33) between the control node and the base station. Then the new transport technology is used (39) on the formed connection for at least one new control plane message between the control node to the base station. The invention comprises also a device for controlling a migration of control plane data transport between a control node and a base station in accordance with the above-described method and a control node comprising such a device.

13 Claims, 5 Drawing Sheets

METHOD AND APPARATUS TO MIGRATE TRANSPORT PROTOCOLS

CROSS-REFERENCE TO RELATED APPLICATION

This application is a 35 U.S.C. §371 National Phase Entry Application from PCT/SE2008/051575, filed Dec. 30, 2008, and designating the United States.

TECHNICAL FIELD

The present invention pertains to the field of wireless communications, and more particular to the part of this field which is concerned with transport options between nodes in a radio access network.

BACKGROUND

For many years there has been an increasing interest in wireless communications using cellular radio communications networks (cellular networks hereinafter). The cellular networks were originally based on analogue radio technologies and used foremost for fixed or mobile radio telephony services. Modern cellular networks are digital and are used for an increased range of services including various data services, such as messaging, downloading of music, video and other files, email communications, Internet access etc. The cellular industry is constantly seeking ways to provide new or improved services. For example, with the introduction of EDGE (Enhanced Data rates for GSM Evolution) technology for GSM (Global System for Mobile communications) and the HSPA (High Speed Packet Access) for WCDMA (Wideband Code Division Multiple Access), data communication using cellular networks has reached new heights. Development of IMS (IP Multimedia Subsystem) provides IP (Internet Protocol) based communications in a variety of modes—including voice, text, pictures and video, or any combination of these—in a highly personalised and secure way. IMS may, for example, be used to provide PoC (Push-to-talk over Cellular).

The cellular network has a design that is based on a number of radio nodes, often referred to as base stations, base transceiver stations, node Bs, radio access points or similar. Hereinafter, for the sake of simplicity, the term base station will be used as a generic expression covering any such radio node. The base stations provide radio coverage in one or more geographical regions, commonly referred to as cells. A user located in one of the cells can access the cellular network with a so-called user equipment (UE), i.e. equipment having necessary radio communication capabilities for communicating with the cellular network via the base stations. For example, the user equipment can be a mobile radio terminal (e.g. a mobile phone) for services such as speech and selected data communications, a personal computer having associated radio communications equipment, a mobile communicator for services such as speech and extensive data communications, a fixed radio telephone etc. The cellular network normally includes a core network linked directly of indirectly to the base stations for providing basic communication services, such as switching and transport, as well as the above-mentioned higher level services. Mobility is normally supported by the cellular network, i.e. the cellular network allows the user to move within the network while using communication services. This is usually accomplished by means of handovers between base stations. Handovers can of course also be performed between cellular networks, in order to support so-called roaming.

One example of a so-called third generation cellular network is the Universal Mobile Telecommunications System (UMTS), which is standardised by an undertaking known as the Third Generation Partnership Project (3GPP). The radio access network in UMTS is abbreviated UTRAN (UMTS Terrestrial Radio Access Network). Key components of the UTRAN are the base stations (Node B) and the Radio Network Controllers (RNC). Communications between the user equipments and the UTRAN is performed over a standardised radio interface, most commonly based on WCDMA (Wideband Code Division Multiple Access). The UTRAN additionally provides connectivity between the core network and the user equipments. The RNC is a governing control node controlling a number of base stations connected to the RNC. The 3GPP specified interface between the RNC and each associated base station is referred to as Iub. NBAP (Node B Application Protocol) is control plane protocol, which is designed to manage the logical resources of the base stations. The NBAP forms the basis for radio network control signalling between the RNC and the base stations and essentially handles all procedures between these two nodes. The NBAP protocol may be subdivided into NBAP common (C-NEAP) and NBAP dedicated (D-NBAP). The C-NBAP controls overall Node-B functionality. C-NBAP procedures are procedures that request initiation of a base station Communication Context for a specific UE in the base station or are not related to a specific UE. C-NBAP procedures also incorporate logical O&M procedures. Consequently, C-NBAP is used for controlling the base station itself, and for setting up dedicated connections towards the UEs. This implies that the common procedures are of a more essential nature. If they are unavailable, it is in principle impossible for RNC to control the base station. D-NBAP procedures are procedures that are related to a specific base station Communication Context in the base station. This base station Communication Context is identified by a Node-B Communication Context identity. Consequently, D-NBAP is used for communication with individual UEs. Each UE is related to a "communication context", thus is it possible to control a plurality of UEs simultaneously. The dedicated procedures are considered less critical, since they only relate to phone call(s).

NBAP control plane data is carried on transport bearers over the Iub interface between the RNC and the base stations. The 3GPP (3GPP TS 25.432) specifies various transport technology options for NBAP signalling over the Iub interface. The traditional transport option is ATM (Asynchronous Transfer Mode), but the 3GPP standard also supports the more modern IP (Internet Protocol) based transport option. Many operators are therefore currently migrating from the ATM based transport option to the IP based transport option. One known way to effect this migration involves the following. All traffic on the base station is stopped in a clean way, i.e. without dropping any calls. The ATM based NBAP connection is thereafter terminated, e.g. closed or cut. The base station is adapted to exhibit a timeout behaviour in response to the termination. That is, when the base station detects an interruption on the NBAP connection, the base station waits for a predetermined time (normally about ten seconds) and, if the NEAP connection is still interrupted, the base station takes down all its cells. This will drop all calls and stop all base station operation within a few seconds. A completely new NEAP connection is established using the new IP based transport option. This procedure can in principle be performed within a few minutes, but nevertheless requires base station down time, and is therefore generally performed at night. The technique requires extra planning and scheduling. This leads to increased costs and lost revenues for the operator, and to bad working hours for staff. Dropped calls may also negatively influence a reputation of the operator.

Consequently, an object of the present invention is to overcome or a least mitigate at least one of the above-indicated difficulties.

SUMMARY

According to one aspect of the present invention, the above-stated object is achieved with a method for migrating control plane data transport between a control node and a base station controlled by the control node from an old and currently used transport technology to a new transport technology. Creation of a protocol stack for the new transport technology in the control node is initiated. And, in a similar manner, creation of a protocol stack for the new transport technology in the base station is initiated. Thereafter, formation of a connection based on the new transport technology between the control node and the base station is initiated. Then use of the new transport technology on the formed connection for at least one new control plane message between the control node to the base station is initiated. The above-stated object is also achieved with device for controlling a migration of control plane data transport between a control node and a base station in accordance with the above-described method; and with a control node comprising such a device.

According to another aspect of the present invention, the above-stated object is achieved with another method for migrating control plane data transport between a control node and a base station controlled by the control node from an old transport technology to a new transport technology. First a temporary prevention of a base station timeout behaviour where the base station takes down operation in all its cells when an interruption on a connection between the control node and the base station remains for more than a predetermined amount of time is initiated. This is followed by initiating barring of each cell of the base station. Termination of an old connection between the control node and the base station is then initiated, the old connection having been used for transport of control plane data using the old transport technology. Opening of a new connection for transport of control plane data using the new transport technology between the control node and the base station is then initiated. Thereafter, unbarring of each cell of the base station is initiated. The above-stated object is also achieved with a device for controlling a migration of control plane data transport between a control node and a base station in accordance with said another method; and with a control node comprising such a device.

A main advantage with the invention is that it allows migration to a new transport technology to be performed in a smooth and seamless manner. That is, the transport migration procedures according to the invention assure that no or only a very few number of calls are lost due to the migration. The transport migration can therefore be performed at any time, resulting in a cheaper and more convenient network operation.

The invention will now be described further using exemplary embodiments and referring to the drawings. A person skilled in the art will appreciate that further objects and advantages may be associated with particular embodiments of the invention.

BRIEF DESCRIPTION OF THE DRAWINGS

FIGS. 4 and 5 are block diagrams illustrating an RNC, a base station and a communication interface there between.

DETAILED DESCRIPTION

Figure 1:
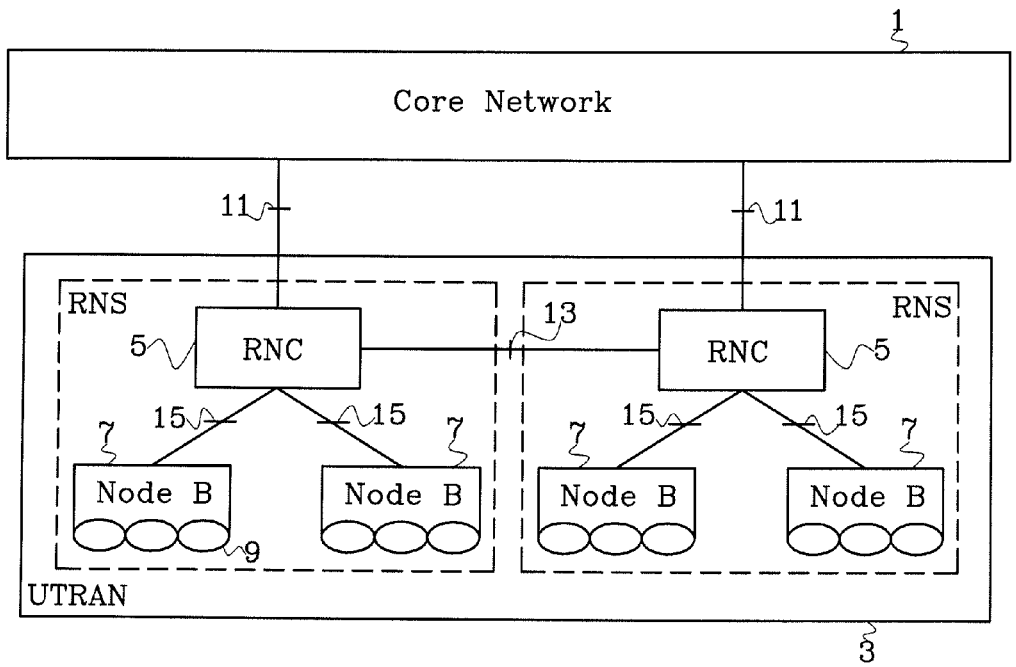
FIG. 1 is block diagram illustrating a UMTS cellular network.

FIG. 1 is a block diagram illustrating an exemplary cellular network where the present invention may be used. The cellular network in FIG. 1 is, by way of example, a UMTS network. A core network 1 is connected to a UTRAN 3, i.e. a radio access network of the UMTS network. The UTRAN 3 comprises RNCs 5 and associated base stations 7. Each base station 7 provides coverage in one or more cells (in this particular example three cells), one such cell being referenced as 9 in FIG. 1. The RNC 5 and the base stations 7 it controls are often referred to as an RNS (Radio Network Subsystem). A skilled person will appreciate that the cellular network in FIG. 1 is simplified so as to not obscure the current presentation with unnecessary detail. For example, the cellular network may include a different number of RNCs 5, and the number of base stations 7 connected to each RNC 5 may also be different. Furthermore, there may also be several core networks 1.

FIG. 1 also illustrates the standardised interfaces connecting the various parts the UMTS network. The so-called Iu interface 11 is an interface defined for communications between the core network 1 and the RNS, i.e. in practice the RNCs 5. The so-called Iur interface 13 is defined for communications between the RNCs 5. The so-called Iub interface 15 is defined for communications between each RNC 5 and the base stations 7 connected to this RNC 5. Control and user plane data is transported on transport bearers over these interfaces.

Figure 2:
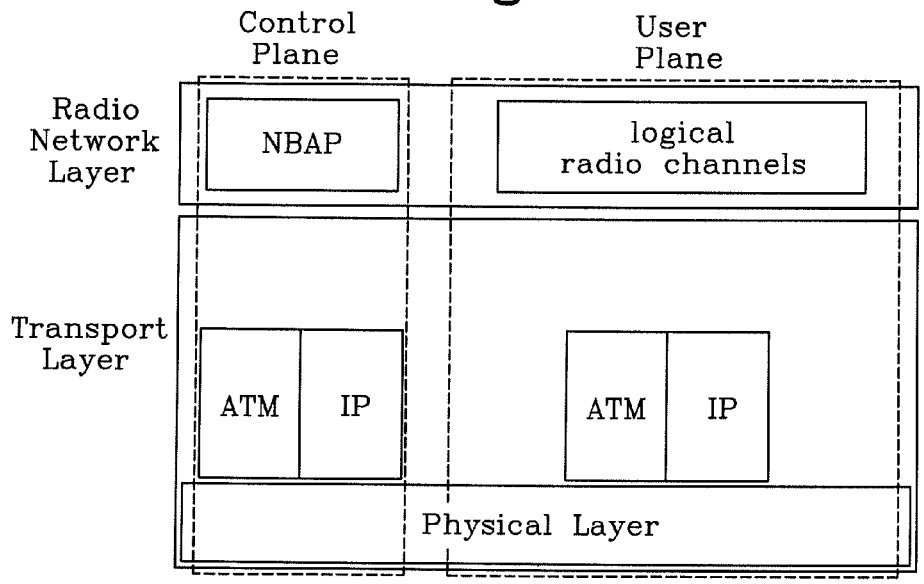
FIG. 2 is diagram illustrating a conventional protocol structure for an Iub interface between a RNC and base station.

FIG. 2 is a diagram illustrating a traditional protocol structure for the Iub interface 15. The protocol structure is divided into layers (horizontal) and planes (vertical). The layers and planes are as far as possible logically independent of each other. This facilitates modification of the protocol structure, when needed. The layers comprise a radio network layer and a transport layer, which in turn includes a physical layer. The planes comprise a radio network control plane (control plane hereinafter) and a user plane. The control plane includes the above-mentioned NBAP in the radio network layer and allows for both ATM and IP based transport options in the transport layer. The user plane includes logical radio channels in the radio network layer and allows for both ATM and IP based transport options in the transport layer.

Figure 3A:
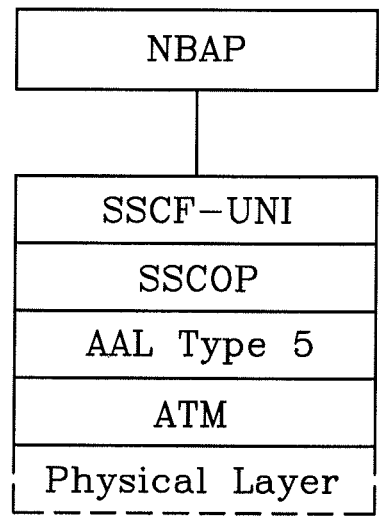
FIG. 3a is a protocol suite diagram illustrating NBAP control built on an ATM based transport option.
Figure 3B:
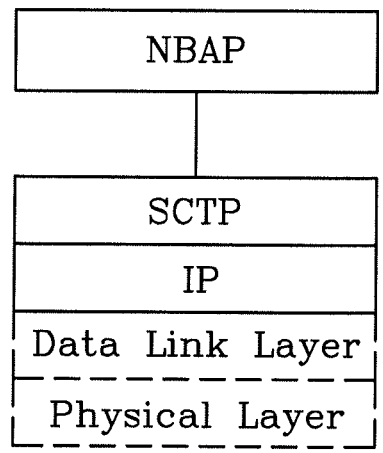
FIG. 3b is a protocol suite diagram illustrating NEAP control built on an IP based transport option.

The standardised (3GPP TS 25.432) protocol layering for NBAP (control plane) transport for ATM and IP based options is illustrated with diagrams in FIGS. 3a and 3b. The protocol suites for these two options are well known to a person skilled in the art. However, for convenience, they will nevertheless be briefly summarised herein. FIG. 3a illustrates how NBAP control is built on ATM based transport technology; and FIG. 3b illustrates how NBAP control is built on IP based transport technology. The physical layers provide the necessary hardware, such as cables (electrical or optical) and drivers for sending signals. In FIG. 3a an ATM layer is formed on top of the physical layer. The ATM layer supports communications in so-called cells (not to be confused with the geographical cells associated with the base stations), which are data packets of a fixed size. Each packet cell includes 53 octets of information, with 5 octets of address and control information and 48 octets of data. More detailed information on the ATM layer may be found, for example, in ITU-T Recommendation 1.361: "B-ISDN ATM Layer Specification". An AAL5 (ATM Adaptation Layer 5) layer is defined on top of the ATM layer. The AAL5 layer allows packets of varying size (up to 65535 octets) to be sent over the ATM layer. More detailed information on AAL5 can be found, for example, in ITU-T Recommendation 1.363.5 (August, 1996): "B-ISDN ATM Adaptation Layer Type 5 Specification". A SSCOP (Service Specific Connection-Oriented Protocol) layer is defined on top of the AAL5 layer. The SSCOP provides an in-sequence transmission and reliable data transfer by supporting retransmission. More detailed information on the SSCOP layer can be found, for example, in ITU-T Recommendation Q.2110 (July, 1994): "B-ISDN ATM adaptation layer—Service specific connection oriented protocol (SSCOP)". The SSCF-UNI (Service Specific Coordination Function—User Network Interface Protocol) layer Creates and maintains a reliable end-to-end connection, and reports if the connection is lost. More detailed information on the SSCF-UNI layer can be found, for example, in ITU-T Q.2130. A data link layer is defined on top of the physical layer in FIG. 3b. The data link layer is normally Ethernet (IEEE 802.3) but can be any suitable kind of packet oriented protocol, such as PPP (Point-to-Point Protocol) or AAL5/ATM. An IP (Internet Protocol) layer is defined on top of the data link layer. The IP protocol supports transfer of packets with up to 65535 octets of information. More detailed information on IP can be found, for example, in IETF RFC 791, (September 1981): "Internet Protocol". A SCTP layer is defined on top of the IP layer. The SCTP layer creates and maintains a reliable end-to-end connection over IP with in-sequence transmission and reliable data. SCTP further supports reports in case a connection is lost. More detailed information on SCTP can be found for example in IETF RFC 2960, (October 2000): "Stream Control Transmission Protocol".

Embodiments of the invention will now be described that illustrate how control plane migration to a new transport technology from an old, i.e. a currently used, transport technology can be performed in an essentially seamless manner, e.g. without having to drop calls. For the purpose of illustration, the new transport technology will be an IP based transport option and the old transport technology will be an ATM based transport option. However, the new and old transport technologies can of course be any suitable transport technologies—in particular, the new transport technology can be an ATM based transport option and the old transport technology can be an IP based transport option. The transport migration relating to control plane data may be complete, i.e. all control plane data will be transported by the new transport technology after migration. However, the transport migration may also be partial, i.e. only transport of specified control plane data is migrated to the new transport technology, the old transport technology being used still for transport of some control plane data. The transport migration relating to control plane data will normally (but not necessarily) be followed by a move of the transport of user plane data to the new transport technology. Alternatively, the user plane data may be handled in a dual mode operation where both the old and the new transport technology remain available for transport of the user plane data.

Figure 4:
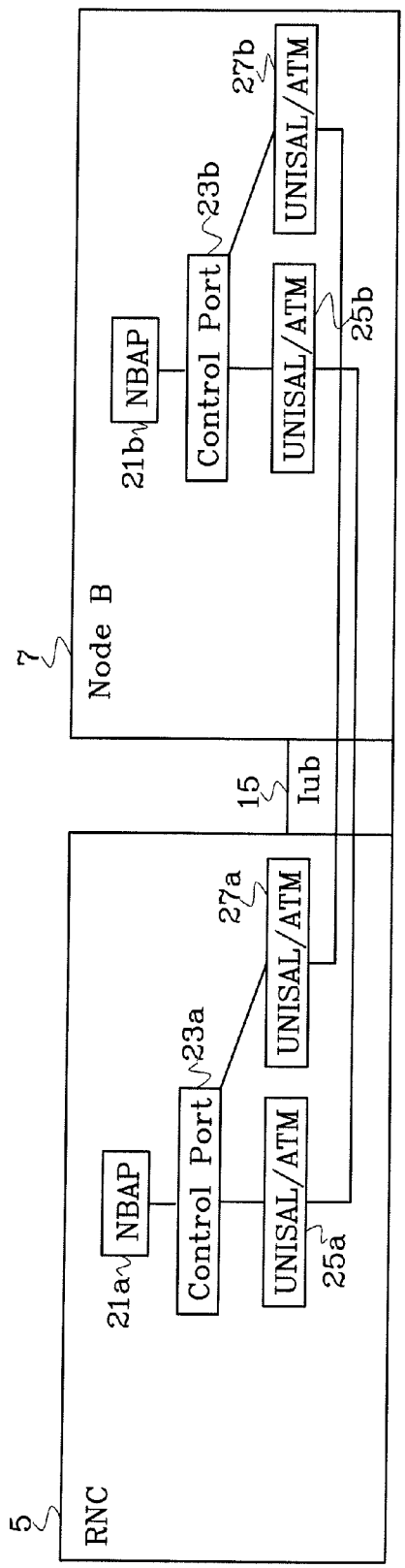

FIG. 4 is a block diagram illustrating transport of NBAP control plane data between an RNC 5 and a base station 7 over the Iub interface 15 using the (old) ATM based transport option. The RNC 5 includes two (for redundancy) ATM transport connection units 25a and 27a, which are connected to respective ATM transport connection units 25b and 27b in the base station 7. An NBAP instance 21a has been created in the RNC 5. The NBAP instance 21a communicates with the connection units 25a and 27a via a control port 23a located in the RNC 5. A corresponding NBAP instance 21b is created in the base station 7. The NBAP instance 21b in the base station 7 communicates with the connection units 25b and 27b via a control port 23b located in the base station 7. The NBAP instances 21a and 21b are here operable to perform both C-NBAP and D-NBAP procedures.

3GPP specifies (3GPP TS 25.430 and 25.433) two types of control ports: Node B control ports and communication control ports. There is only one Node B control port per base station (Node B), but lower layers can be redundant. The Node B Control port is used to exchange signalling information for logical O&M of the base station 7, the creation of Node B Communication Contexts, the configuration of common transport channels that the base station 7 provides in any given cell, PCH and BCH control information between the RNC 5 and the base station 7. The Node B Control port corresponds to one signalling bearer between the RNC 5 and the base station 7. Consequently, the Node B control port is used for C-NBAP procedures. The communication control port corresponds to one signalling bearer between the RNC 5 and the base station 7 for the control of the Node B Communication Contexts. One signalling bearer between RNC 5 and base station 7 can at most correspond to one communication control port. The base station 7 may have multiple communication control ports (one per Traffic Termination Point). The Communication control port is selected at creation of the Node B Communication Context. The communication control port is re-selected when the signalling bearer for the control of the base station 7 communication is rearranged. Consequently, the communication control port is used for D-NBAP procedures. According to the 3GPP standard, there must be one communication control port, but the standard allows for several—which of course can be useful if base the station architecture has a pool of independent traffic terminating entities.

Figure 5:
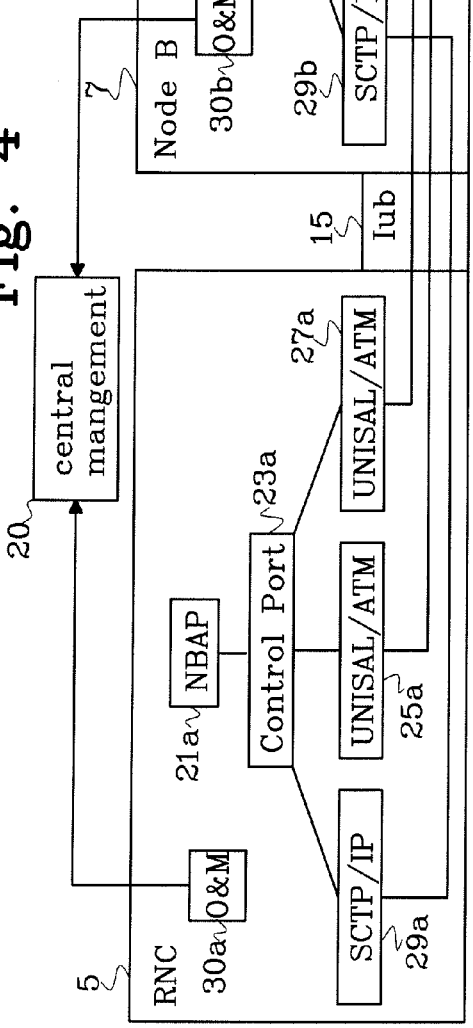

FIG. 4 consequently illustrates the control plane transport situation between RNC 5 and the base station 7 before migration to the IP based transport option has begun. In order to make it possible for the migration process to start, the RNC 5 and the base station 7 are provided with the necessary software and hardware to support the IP based transport option, assuming of course that this has not been done earlier. This is illustrated in FIG. 5, which is a block diagram similar to that in FIG. 4. In FIG. 5, the RNC 5 now includes an IP transport connection unit in the form of an IP transport client 29a, and the base station 7 includes a corresponding IP transport connection unit in the form of an IP transport server 29b. A physical link is also provided to support Iub interface IP transport 15 between the client 29a and the server 29b. The client 29a and the server 29b need not be duplicated to provide redundancy, since IP transport redundancy can be handled inside an SCTP part of a protocol stack.

The RNC 5 of FIG. 5 further comprises a local O&M (Operation and Maintenance) unit 30*a*; and the base station 7 similarly comprises a corresponding local O&M unit 30*b*. The local O&M units 30*a* and 30*b* are, in this exemplary embodiment, connected to a central management unit 20. The local O&M units 30*a* and 30*b* are also connected to the other parts of the RNC 5 and the base station, respectively, by means of internal communication systems (not shown) of the RNC 5 and the base station 7. According to exemplary embodiments, the local O&M units 30*a* and/or 30*b* may serve as control units for initiating and controlling various aspects of the transport migration, as will be described in more detail below. This is convenient, since local O&M units are usually included in conventional RNC and base station design. However, the same or similar functions can equally well be performed by other forms of controllers, e.g. controllers which are specifically provided for this purpose. The local O&M units 30*a* and 30*b* or other forms of controllers may be implemented using application specific circuitry or programmable circuitry, or any suitable combination thereof. The person skilled in the art will also appreciate that such an implementation may also be based fully or partially on a computer programmed with suitable software.

Figures 6, 7:
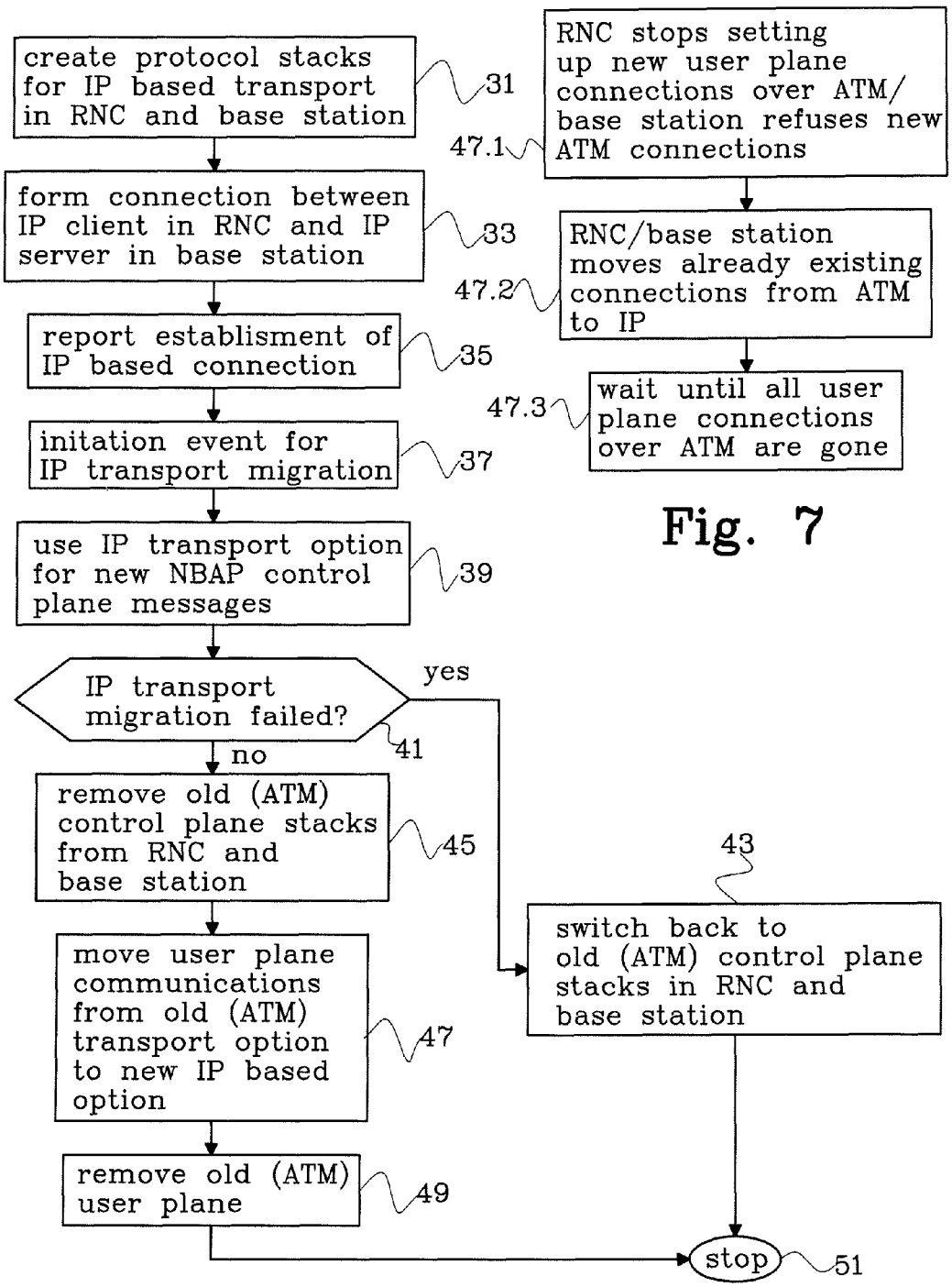
FIG. 6 is a flow chart illustrating a method for migration of control plane data transport according to an embodiment of the invention.
FIG. 7 is a flow chart illustrating a method for moving user plane connections to a new transport technology according to an embodiment of the invention.

FIG. 6 is a flow chart illustrating a method of essentially seamless migration of control plane transport from the ATM based transport option to the IP based transport option in accordance with an embodiment of the invention. At a block 31, protocol stacks for the IP based transport option are created in the RNC 5 and the base station 7. The creation of the IP based protocol stacks may, in a particular embodiment, be performed by the local O&M units 30*a* and 30*b*. The creation may be initiated by the central management node 20 or, alternatively, by any one of the local O&M units 30*a* or 30*b*. At a block 33, an IP based connection is formed between the IP transport client 29*a* and the IP transport server 29*b*. The formation of the IP based connection may in principle be initiated from either the RNC side or the base station side. However, normally, the formation the IP based connection would be initiated from the RNC 5, e.g. by the local O&M unit 30*a* or the IP transport client 29*a*. At a block 35, the IP transport client 29*a* and the IP transport server 29*b* report the formation of the IP based connection to their respective control port 23*a* and 23*b*.

This far, NBAP control plane data transport is still handled solely through the AMT based transport option. Consequently, the steps performed up to this point are made in preparation for the IP transport migration, allowing the transport migration to be performed in a smooth and seamless manner once it is time for the transport migration to take place. In this particular embodiment, an initiation event for migration to IP based transport occurs at a block 37. The initiation event may be any predefined event that determines a suitable start for the migration to IP based NBAP control plane data transport over the Iub interface 15 between the RNC 5 and the base station 7. One exemplary initiation event is a receipt, e.g. at the RNC 5, of a transport migration order from, for example, an operation and maintenance system. In a particular embodiment, the transport migration order may come from the central management unit 20 via the local O&M unit 30*a* or from the local O&M unit 30*a*. Another exemplary initiation event is a receipt of a message indicating that the ATM based transport option is no longer available. Yet another exemplary initiation event is the report to the control port 23*a* made at the block 35; in this case, migration to the IP based transport option consequently starts as soon as the IP based connection between the client 29*a* and the server 29*b* has been formed at the block 33.

In response to the initiation event at the block 37, the RNC 5 starts to use the IP based transport option for all new NBAP control plane messages to the base station 7 at a block 39. In a particular embodiment, the local O&M unit 30*a* may be used for initiating the use of the IP based transport option. Consequently, the RNC 5 no longer sends NBAP control plane data to the base station 7 using the ATM based transport option over the Iub interface 15. The RNC 5 may, however, still listen to NBAP control plane data transmitted from the base station 7 using the ATM based transport option over the Iub interface 15. When the IP transport server 29*b* detects a first NBAP control plane message from the IP transport client 29*a*, the server 29*b* informs the control port 23*b* of this fact. The control port 23*b* thereafter executes any NBAP control plane messages from the base station 7 to the RNC 5 through the IP based transport option via the server 29*b* and the Iub interface 15. Alternatively, the migration to IP based transport can relate, at least initially, to only a selected subset of the NBAP control plane data. For example, the migration may, at least initially, include only control plane data relating to C-NBAP procedures.

At a block 41, a test is performed in order to determine whether the migration of the control plane data transport has been successful or not. In a particular embodiment, the test may, for example, be performed by the control port 23*a* of the RNC 5. If the migration has not been successful, a switch back to the ATM transport option is performed at a block 43 (provided of course that this alternative is still available), and the procedure stops at a block 51. If the migration has been successful, ATM control plane stacks are removed from the RNC 5 and the base station 7 at a block 45. In a particular embodiment, the local O&M unit 30*a* may be responsible for initiating and overseeing the removal of the old ATM control plane stacks. In the exemplary embodiment of FIG. 6, user plane communications between the RNC 5 and the base station 7 are now also moved from the ATM based transport technology to the IP based transport technology at a block 47. In a particular embodiment, the local O&M unit 30*a* and/or the NEAP instance 21*a* may be responsible for the move of the user plane communications. Once the user plane communications have been moved, the ATM user plane is removed at a block 49, and the procedure stops at the block 51. In a particular embodiment, the local O&M unit 30*a* may be responsible for initiating and overseeing the removal of the ATM user plane.

FIG. 7 is a flowchart illustrating one advantageous way of performing the move of user plane communications at the block 47 in FIG. 5. At a block 47.1, the RNC 5 stops setting up new user plane connections using the ATM transport option. Alternatively, the base station 7 may refuse any new user plane connection based on the ATM transport option. At a block 47.2, the RNC 5, or the base station 7, initiates a move of already existing user plane connections from the ATM based transport option to the IP based transport option. Thereafter, it is only to wait, as indicated by a block 47.3, until there are no more user connections that make use of the ATM transport option. The block 47.2 is, however, entirely optional, since any user plane connection using the ATM transport option will eventually terminate.

Figure 8:
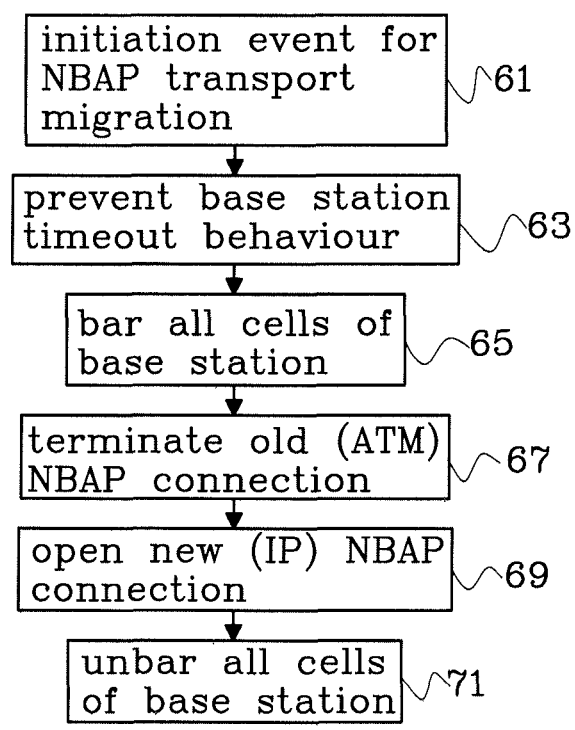
FIG. 8 is a flow chart illustrating a method for migration of control plane data transport according to an embodiment of the invention.

FIG. 8 is a flow chart illustrating another embodiment for essentially seamless migration of control plane data transport to a new transport option, here an IP transport option. At a block 61, an initiation event for migration of NBAP control plane transport occurs. The initiation event may, for example, be any one of the initiation events mentioned in connection with the embodiment illustrated in FIG. 6. As mentioned earlier, the base station 7 is normally adapted to exhibit a timeout behaviour in response to an interruption on the NEAP connection between the base station 7 and the RNC 5. That is, when the base station 7 detects (or is informed of) an interruption on the NEAP connection, the base station 7 waits for a predetermined time (normally about ten seconds) and, if the NBAP connection is still interrupted, the base station takes down all its cells. This will normally drop all calls and stop all base station operation within a few seconds. In this embodiment, however, at a block 63, the time out behaviour of base station 7 is prevented. This may, for example, be done by substantially extending the above-mentioned predetermined time, e.g. from a few seconds to one or several minutes, allowing ample time for the migration to take place. After the timeout behaviour has been prevented, all cells of the base station are barred at a block 65. A barred cell is a cell that is not acceptable for use, not even for emergency calls. The fact that the barred cell is barred is broadcasted in the cell. After the cell has been barred, no new calls are supported by the cell. However, already ongoing calls will not be affected by the barring. If a UE is camping on another cell, the UE shall exclude the barred cell from its neighbouring cell list until expiry of time interval Tbarred. The time interval Tbarred is sent via system information in the barred cell together with cell status information. If the UE does not select another cell and the barred cell remains the preferred cell, the UE shall after expiry of the time interval Tbarred check again whether the status of the barred cell has changed. At a block 67, the old ATM based NEAP connection is terminated, e.g. by being closed or cut. No new calls can be set up, but ongoing calls will resume, since the user plane is still available. After termination of the old NBAP connection, a new IP based NEAP connection between the RNC 5 and the base station 7 is opened together with associated protocol stacks for the IP based transport of NBAP control plane data at a block 69. Once the new IP based NBAP connection has been opened, the cells of the base station 7 are unbarred at a block 71. The transport of the NBAP control plane data has now been migrated to the new IP based transport option, and transport of the user plane data may also be migrated to the new IP based transport option, e.g. as described in the embodiment illustrated in FIGS. 6 and 7. Admittedly, with the embodiment illustrated in FIG. 8, some calls may still be dropped, since handover procedures and various measurement procedures depend on the NBAP protocol. However, any dropped calls will be relatively few. Moreover, the embodiment illustrated in FIG. 8 has the advantages of being fairly simple and requiring few system modifications in order to be performed. The RNC 5 may, for example, be responsible initiating and controlling the various steps involved transport migration procedure of FIG. 8. In a particular embodiment, the local O&M unit 30a, or a similar control unit, may be used for this purpose.

Above, the invention has been described using various embodiments. These embodiments are, however, intended only as non-limiting examples, and the scope of protection is instead defined by the appending claims.

The invention claimed is:

1. A method for migrating control plane data transport between a control node and a base station controlled by the control node from first transport technology to a second transport technology, the method comprising:
   initiating creation of a protocol stack for the second transport technology in the control node;
   initiating creation of a protocol stack for the second transport technology in the base station;
   initiating formation of a connection based on the second transport technology between the control node and the base station; and
   initiating use of the second transport technology on the formed connection for at least one control plane message between the control nodes to the base station, wherein the method further comprises:
   initiating performance of a test to determine whether the migration to the second transport technology has been successful or not; and
   initiating a switch-back to the first transport technology for control plane data transport in case the migration to the second transport technology has not been successful.

2. The method according to claim 1, wherein the step of initiating the use of the second transport technology on the formed connection is performed in response to an occurrence of a predefined transport migration initiation event.

3. The method according to claim 2, wherein the predefined initiation event comprises one or more of the following events:
   receipt of a transport migration order from an operation and maintenance system;
   receipt of a message indicating that the connection based on the second transport technology has been formed; or
   receipt of a message indicating that the first transport technology is no longer available.

4. The method according to claim 1, wherein the method further comprises initiating removal of protocol stacks associated with the first transport technology after starting to use the second transport technology on the formed connection.

5. The method according to claim 1, wherein the method further comprises initiating a move of user plane communications between the control node and the base station from the first transport technology to the second transport technology after starting to use the second transport technology on the formed connection between the transport client and the transport server for control plane messages.

6. The method according to claim 1, wherein the control node and the base station are adapted for operation in an UMTS network and wherein the step of initiating use of the second transport technology on the formed connection involves initiating transport of at least a portion of new NBAP messages with the second transport technology.

7. The method according to claim 6, wherein the portion of new NBAP messages includes at least all new C-NBAP messages.

8. A device for controlling a migration of control plane data transport between a control node and a base station controlled by the control node from first transport technology to a second transport technology, the device being adapted to:
   initiate creation of a protocol stack for the second transport technology in the control node;
   initiate creation of a protocol stack for the new transport technology in the base station;
   initiate formation of a connection based on the second transport technology between the control node and the base station;
   initiate use of the second transport technology on the formed connection for at least one new control plane message between the control nodes to the base station;
   initiate performance of a test to determine whether the migration to the second transport technology has been successful or not; and
   initiate a switch-back to the first transport technology for control plane data transport in case the migration to the second transport technology has not been successful.

9. A control node for controlling a base station, the control node comprising:
a device for controlling a migration of control plane data transport between a control node and a base station controlled by the control node from first transport technology to a second transport technology, the device being adapted to:
initiate creation of a protocol stack for the second transport technology in the control node,
initiate creation of a protocol stack for the new transport technology in the base station,
initiate formation of a connection based on the second transport technology between the control node and the base station,
initiate use of the second transport technology on the formed connection for at least one new control plane message between the control nodes to the base station,
initiate performance of a test to determine whether the migration to the second transport technology has been successful or not, and
initiate a switch-back to the first transport technology for control plane data transport in case the migration to the second transport technology has not been successful.

10. A method for migrating control plane data transport between a control node and a base station controlled by the control node from a first transport technology to a second transport technology, the method comprising:
initiating a temporary prevention of a base station timeout behaviour where the base station takes down operation in all its cells when an interruption on a connection between the control node and the base station remains for more than a predetermined amount of time;
initiating barring of each cell of the base station;
initiating termination of a first connection between the control node and the base station, the first connection being used for transport of control plane data using the first transport technology;
initiating opening of a second connection between the control node and the base station and use of the second connection for transport of control plane using the second transport technology; and
initiating unbarring of each cell of the base station, wherein the step of initiating the temporary prevention of the timeout behaviour comprises initiating a substantial extension of the predetermined amount of time.

11. A device for controlling migrating of control plane data transport between a control node and a base station controlled by the control node from a first transport technology to a second transport technology, the device being adapted to:
initiate a temporary prevention of a base station timeout behaviour where the base station takes down operation in all its cells when an interruption on a connection between the control node and the base station remains for more than a predetermined amount of time, wherein the device is adapted to initiate the temporary prevention of the timeout behaviour by initiating a substantial extension of the predetermined amount of time;
initiate barring of each cell of the base station;
initiate termination of an old connection between the control node and the base station, the old connection being used for transport of control plane data using the old transport technology;
initiate opening of a new connection between the control node and the base station and using the new connection for transport of control plane using the second transport technology; and
unbar of each cell of the base station.

12. A control node for controlling a base station, the control node comprising:
a device for controlling migrating of control plane data transport between a control node and a base station controlled by the control node from a first transport technology to a second transport technology, the device being adapted to:
initiate a temporary prevention of a base station timeout behaviour where the base station takes down operation in all its cells when an interruption on a connection between the control node and the base station remains for more than a predetermined amount of time, wherein the device is adapted to initiate the temporary prevention of the timeout behaviour by initiating a substantial extension of the predetermined amount of time,
initiate barring of each cell of the base station,
initiate termination of an old connection between the control node and the base station, the old connection being used for transport of control plane data using the old transport technology,
initiate opening of a new connection between the control node and the base station and using the new connection for transport of control plane using the second transport technology, and
unbarring of each cell of the base station.

13. The method of claim 10, wherein the initiating barring of each cell of the base station includes not accepting new calls after the initiating barring of each cell of the base station, and not terminating calls ongoing prior to the initiating barring of each cell of the base station.

\* \* \* \* \*